US012201198B1

(12) United States Patent
Hunt et al.

(10) Patent No.: US 12,201,198 B1
(45) Date of Patent: Jan. 21, 2025

(54) GOLF CLUB BOOT

(71) Applicants: John Hunt, Minnetonka, MN (US); Sara Hunt, Minnetonka, MN (US)

(72) Inventors: John Hunt, Minnetonka, MN (US); Sara Hunt, Minnetonka, MN (US)

( * ) Notice: Subject to any disclaimer, the term of this patent is extended or adjusted under 35 U.S.C. 154(b) by 0 days.

(21) Appl. No.: 18/616,676

(22) Filed: Mar. 26, 2024

(51) Int. Cl.
*A45B 3/00* (2006.01)
*A45B 9/02* (2006.01)
*A45B 9/04* (2006.01)
*A61H 3/02* (2006.01)
*A63B 53/14* (2015.01)
*A63B 60/62* (2015.01)

(52) U.S. Cl.
CPC .................. *A45B 3/00* (2013.01); *A45B 9/02* (2013.01); *A45B 9/04* (2013.01); *A61H 3/0288* (2013.01); *A63B 60/62* (2015.10); *A63B 53/14* (2013.01)

(58) Field of Classification Search
CPC .................................................... A61H 3/0288
See application file for complete search history.

(56) References Cited

U.S. PATENT DOCUMENTS 3,040,757 A * 6/1962 Smith .................. A61H 3/0288 135/86
3,289,685 A 12/1966 Mccall
4,899,771 A * 2/1990 Wilkinson ............... A45B 9/04 135/84
6,024,110 A 2/2000 Renfro
6,131,593 A 10/2000 Greene
6,961,967 B1 * 11/2005 Brown ................. A61H 3/0288 5/81.1 R
7,712,478 B2 * 5/2010 Gibbons .................. A61H 3/02 248/188.5
7,802,581 B2 * 9/2010 Heim ....................... A45B 9/04 135/77
8,678,021 B2 * 3/2014 Vasilatos .............. A61H 3/0288 135/84
8,844,548 B2 9/2014 Soletski
9,386,830 B2 * 7/2016 Crowhurst ............... A45B 3/04
9,723,901 B1 8/2017 Ober
2004/0107982 A1 * 6/2004 Morris ................. A61H 3/0288 135/77
2011/0259381 A1 * 10/2011 Adams ..................... A45B 9/04 135/82
2014/0373887 A1 * 12/2014 Gray ........................ A45B 9/04 135/77

FOREIGN PATENT DOCUMENTS

DE 3112315 A1 * 10/1982
DE 20300511 U1 * 3/2003 ............. A45B 21/00
JP 3222920 U * 9/2019
KR 20100012502 U * 12/2010

* cited by examiner

*Primary Examiner* — David R Dunn
*Assistant Examiner* — Danielle Jackson
(74) *Attorney, Agent, or Firm* — Johnson and Phung; Thomas N. Phung

(57) ABSTRACT

A golf club boot having a sole with a sleeve partially buttressed by a set of ribs with the buttressed sleeve extending upward from the sole supporting an upside-down golf club therein in upright condition when the golf club boot is used as a cane stand with the sleeve pivotable to maintain the sole in ground contact during a walking motion of a person using a golf club head as a cane handle.

17 Claims, 7 Drawing Sheets

FIG. 2
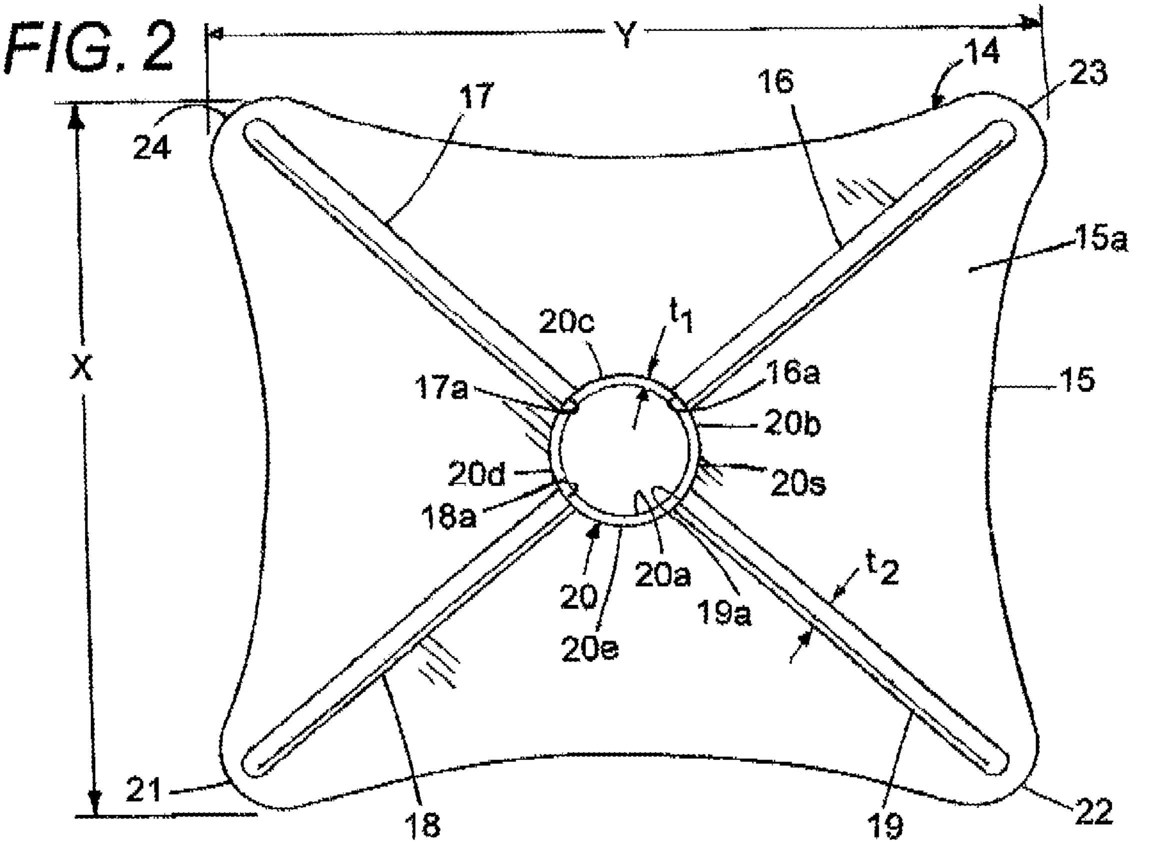
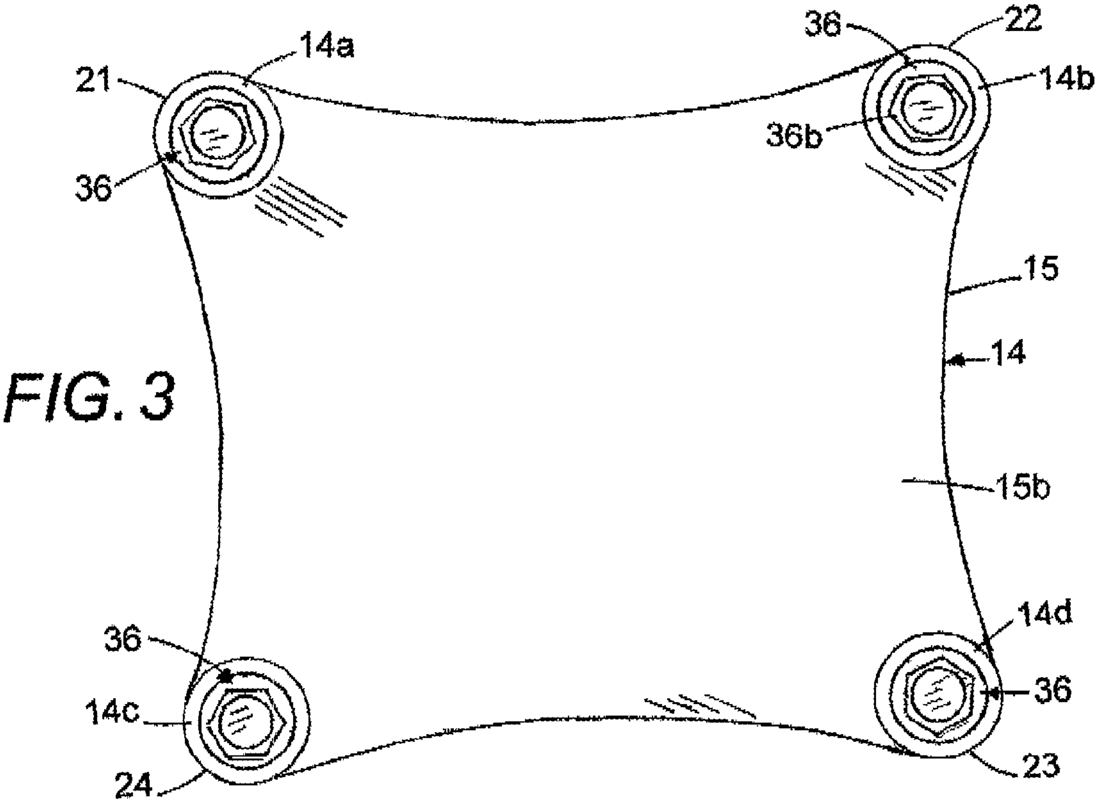
FIG. 3

GOLF CLUB BOOT

FIELD OF INVENTION

The present invention relates to walking canes and, more specifically, to a golf club boot that converts a golf club to a golf club cane with the golf club boot having a sole that follows the terrain as the person walks and a sleeve that holds the golf club cane in an upright ready to use position when the golf club cane is not in use.

CROSS REFERENCE TO RELATED APPLICATIONS

None

STATEMENT REGARDING FEDERALLY SPONSORED RESEARCH OR DEVELOPMENT

None

REFERENCE TO A MICROFICHE APPENDIX

None

BACKGROUND OF THE INVENTION

The use of various tips on canes or walking sticks is well known in the art.

U.S. Pat. No. 6,024,110, disclose a golf club cane which does not include an actual golf club but is intended to look like a golf club with the cane having a shaft with a rim on the end to hold a cylindrical tip of non-slip material on the shaft, which is pointed out could be a furniture leg.

U.S. Pat. No. 3,289,685 shows a step stick walking aide with a tubular section attached to a foot plate with four rubber tips attached to the bottom of the foot plate. A bolt that extends through the foot plate holds the rubber tips on a floor flange that attaches to a tubular section by a bolt. The patent points out that "In using this foot in a normal walking, a first pair of the four tips first engage the ground. As the walker advances, all four tips contact the ground as the aid passes through the vertical that is the second pair of tips become effective as the first pair of tips leaves or are elevated from the surface." U.S. Pat. No. 3,289,685 goes on to point out that "foot plate 2 is at a point offset forwardly from the geometrical center thereof." and that "as the result of this feature, the aid will stand alone upon a horizontal surface".

U.S. Pat. No. 9,723,901 show a self-righting cane that has a circular weight attached to the end of the cane to prevent the cane from falling over.

U.S. Pat. No. 8,844,548 discloses a support block for the end of cane with one embodiment of the support block having a rounded bottom and a second embodiment with a flat bottom. Each of the support blocks having slits that form threads with the patent pointing out the semi-elliptical shaped bottom, is better for walking in rough terrain.

U.S. Pat. No. 6,131,593 discloses a cane tip having a circular central region and a set of branches extending outward from the circular central region with the cane tip permitting a cane therein to be "self-standing".

SUMMARY OF THE INVENTION

While self-standing stick canes are known in the art and golf club canes are also known in the art a difficulty with a self-standing golf club cane that uses an actual golf club iron, (which is metal), as a cane handle is that the golf club cane becomes top-heavy. Making a top-heavy golf club cane self-standing requires a large stiff connecter on the base while on the other hand to be useful as a cane the connector that supports the grip of the golf club should be able to pivot with respect the base to maintain the base in ground contact as a person walks about using the golf club cane. In addition, the golf club should be easy to insert or remove from the base since permeant attachment of the golf club to the base prevents the golf club from future use as a golf club.

The present invention converts an actual golf club into a walking cane that overcomes a difficulty in making a stand-alone golf club cane through use of a golf club boot frictionally attachable to a grip of a golf club, with the golf club boot having a sole for ground engagement on a bottom side of the golf club boot and a multi-functional resilient sleeve partially buttressed by a set of ribs on a top side of the sole. The sleeve with the set of ribs buttressing a portion of the sleeve normally holding the actual golf club in a vertical orientation when the golf club boot is used as a stand. The portions of the sleeve not buttressed by the set of ribs remain resilient to expand to permit hand insertion of a grip of a golf club into frictional engagement with the sleeve. In addition, the resiliency of portions of the sleeve that are not buttressed by the set of ribs permit the sleeve and the golf club to pivot with respect to the sole of the golf club boot allowing the sole to maintain ground engagement as a person walks about using the golf club cane for support.

BRIEF DESCRIPTION OF THE DRAWINGS

FIG. 2 is a top view of the golf club boot with a multi-functional sleeve buttressed by a set of ribs;

FIG. 3 is a bottom view of the golf club boot of FIG. 2 with a foot located on each corner with each of the feet having a cleat attached thereto;

DESCRIPTION OF THE PREFERRED EMBODIMENT

Figure 1:
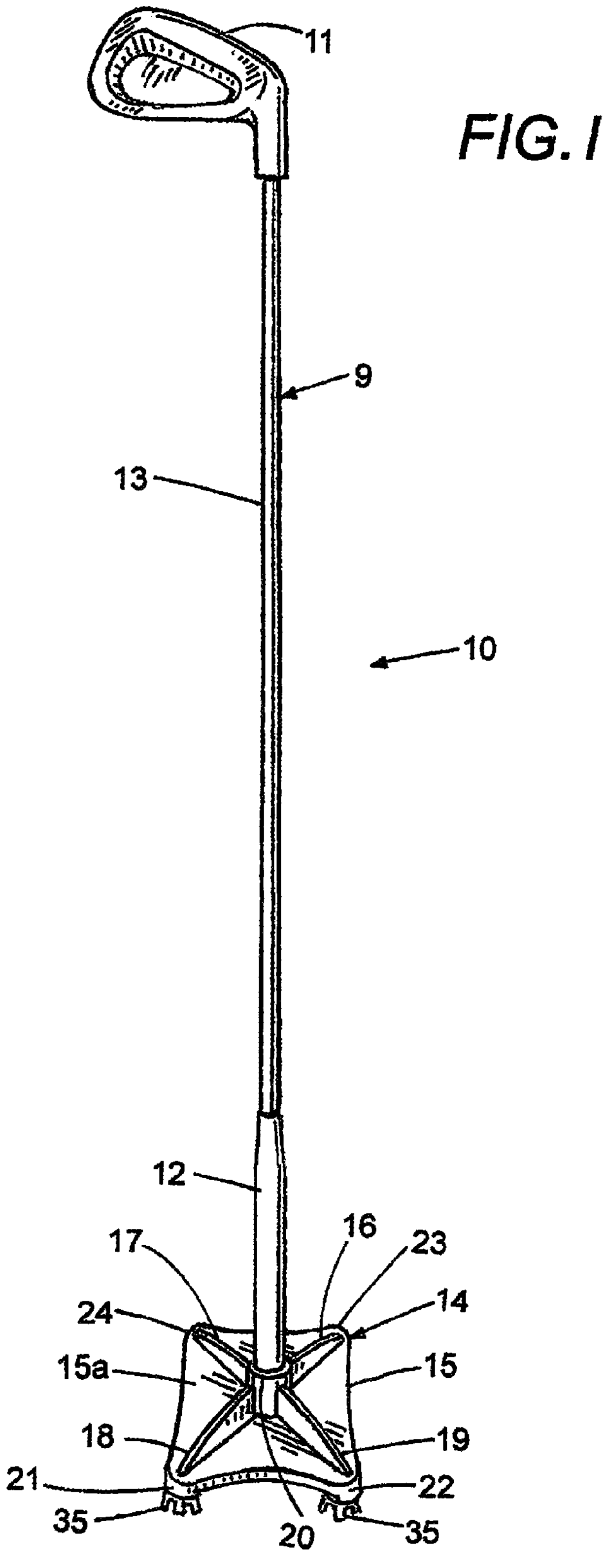
FIG. 1 shows a golf club cane with an actual golf club held in an upright ready to use position by a golf club boot.

FIG. 1 shows an example of a golf club cane 10 holding a golf club 9 in a vertical upside-down position in a resilient, multi-functional, cylindrical sleeve 20 located on the top of a one-piece golf club boot 14. FIG. 2 shows an isolated top view of the one-piece golf club boot 14 that can be frictionally attached to a grip 12 of golf club 9 through a resilient, multi-functional, cylindrical sleeve 20, which extends vertically upward from a sole 15 of boot 14 with sleeve 20 buttressed by a set of ribs 16, 17, 18 and 19. Each of the ribs are attached to top side 15*a* of sole 15 and an outer face of cylindrical sleeve 20.

FIG. 1 and FIG. 2 show each of the ribs have a right-angled end with one face of the right-angled end attached to an exterior cylindrical surface 20*e* of sleeve 20 and the other face of the right-angled end attached to top side 15*a* of sole 15. In this example the ribs, the cylindrical sleeve 20, and sole 15 are molded in one piece, preferably from a resilient elastomer such as urethane having a durometer of 80A although other elastomers such as thermoplastic rubber resins may be used.

In the example shown clubhead 11 comprises a golf club iron, which is usable as a cane handle, while a grip 12 on the end of golf club shaft 13 attaches to golf club boot 14 through resilient, multi-functional, cylindrical sleeve 20, which is located on topside 15*a* of sole 15.

FIG. 1, FIG. 2, and FIG. 3 show golf club boot 14 includes a sole 15 with a top side 15*a* and a bottom or ground side 15*b* with multi-functional, cylindrical sleeve 20 partially buttressed by a set of ribs 16, 17, 18 and 19, which extend upward from top side 15*a* of sole 15 with ribs 16 and 18 located on opposite sides of sleeve 20 but in alignment with each other. Similarly, ribs 17 and 19 that are located on opposite sides of sleeve 20 are in alignment with each other. In this example sole 15 is a rectangular shaped one-piece elastomer slab that includes a set of rounded corner feet 21, 22, 23 and 24. Sole 15 having sufficient width (x or y) so that when a golf club 9 is held in sleeve 20 the center of gravity of clubhead 11 is not outside a footprint of sole 15, which could cause golf club 9 and sole 15 to tip over. That is, sole 15 should have lateral dimensions sufficient so that a golf club extending vertically from a center of boot 14 does not generate a lateral force that could cause sole 15 with golf club 9 therein to tip. Factors that affect the size of the boot may include the length of a golf club head, the weight of golf club head, the material of the sole as well as the material of sleeve 20 to maintain golf club shaft 13 in a vertical orientation. Although no limitation is intended by way of example a golf club boot 14 made of urethane with the sole having a thickness $T_2$ of ⅜ inches (see FIG. 9 and FIG. 10) and lateral dimensions (x, y) of 5.5×6.5 inches (see FIG. 2) has been found to maintain most golf clubs in a vertical condition when the golf club iron is parallel to the longer length of the golf club boot 14. In the event a heaver club with a longer shaft is used one can increase the length Y of golf club boot 14 to support a heavier club in an upright position.

A feature of the invention is that sleeve 20 is buttressed by a set of ribs 16, 17, 18 and 19 to assist sleeve 20 in holding golf club 9 in a vertical ready to use condition when golf club boot 14 is used in a stand mode. In this example a thin-walled resilient sleeve 20 of thickness $t_1$ has an interior cylindrical surface 20*a* forming an interference fit with grip 12 thus creating frictional engagement therebetween that holds grip 12 within sleeve 20 during use of the golf club cane 10. The four ribs 16, 17, 18, and 19 that buttress portions of the exterior cylindrical surface 20*b* resist flexing or bending of sleeve 20 thus holding golf club therein in a vertical orientation with respect to golf club boot 14 while also stiffening sole 15. Thus a feature of the set of ribs 16, 17, 18 and 19 in engagement with sole 15 can stiffen the sole to inhibit flexing of sole 15.

Figure 7:
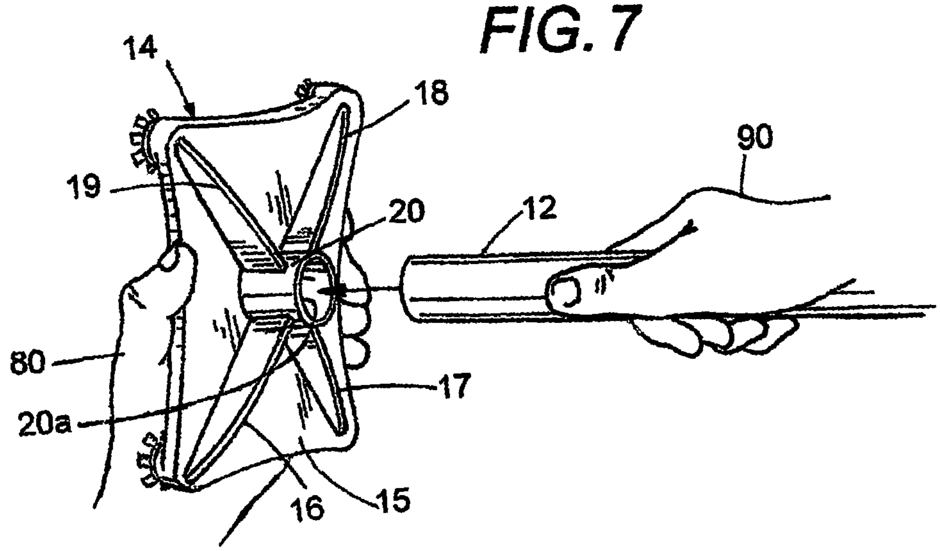
FIG. 7 shows a person securing a golf club boot to a hand grip of a golf club by holding the golf club boot in one hand while using the other hand to axially insert a golf club hand grip into a sleeve on the golf club boot.

The assembly of a golf club grip 12 to a golf club boot 14 is shown in FIG. 7. During the assembly process the portions of sleeve 20 that are not buttressed by the set of ribs remain resilient allowing the non-buttressed portions of sleeve 20 to expand for hand insertion of grip 12 into frictional engagement within sleeve 20.

Figure 8:
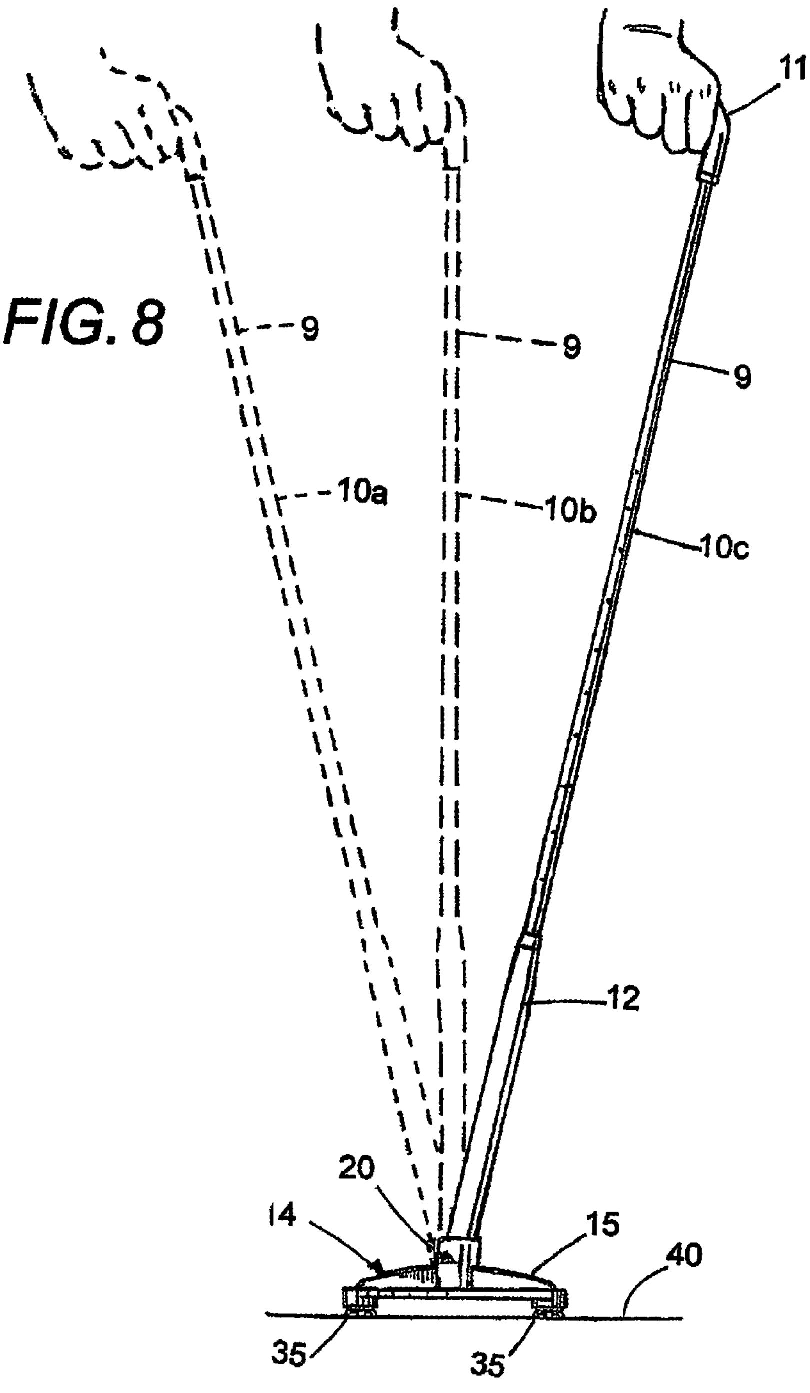
FIG. 8 illustrates in dashed lines the positions of the golf club shaft as a multi-functional sleeve pivots when a person walks about using the golf club cane for support.

In addition, the resiliency of portions of sleeve 20 that are not buttressed by the set of ribs allow sleeve 20 and golf club 9 therein to pivot with respect to sole 15, which allows all the feet on sole 15 of golf club boot 14 to maintain ground engagement as a person walks about using golf club cane 10 for support. A typical walking motion using golf club cane 10 is illustrated in FIG. 8, which shows golf club 9 in three different positions 10*a*, 10*b* and 10*c*. In this example the resiliency of cylindrical sleeve 20 not only frictionally maintains the golf club within sleeve 20 but allows portions of the sleeve that are unsupported by the set of ribs to flex and pivot with golf club 9 even though the portions of sleeve 20 having ribs buttressing the sleeve resist flexing of sleeve 20. The resistant to flexing of sleeve 20 can enhance a contraction force between sleeve 20 and grip 12 to increase the frictional forces that maintain golf club 9 in sleeve 20. In this example the portions of sleeve 20 not buttressed by the set of ribs can flex in response to pivoting of the golf club 9 with respect to boot 14 as a person walks about using golf club cane 10, which allows feet on sole 15 to maintain ground contact as a person walks about as illustrated in FIG. 8. As used herein the term ground includes interior or exterior surfaces that a person may walk on.

FIG. 3 is a bottom view of golf club boot 14 of FIG. 1 revealing a set of peripheral corner feet 21, 22, 23 and 24. Corner foot 21 includes an ice cleat 36, similarly corner foot 22 includes and ice cleat 36, corner foot 23 includes an ice cleat 36 and corner foot 24 includes an ice cleat 36. FIG. 4 is a side view of golf club boot 14 showing ice cleats 36 in biting engagement with a sheet of ice 37.

Figure 3A:
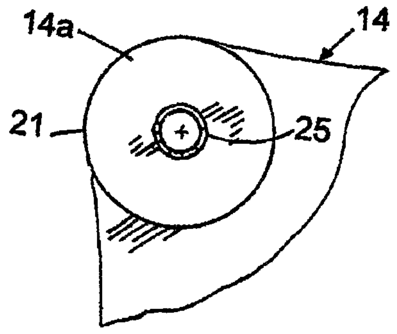
FIG. 3A is an isolated view of a peripheral foot located on the underside of the golf club boot with the foot containing an embedded stud having a female thread engageable with a cleat.
Figure 4:
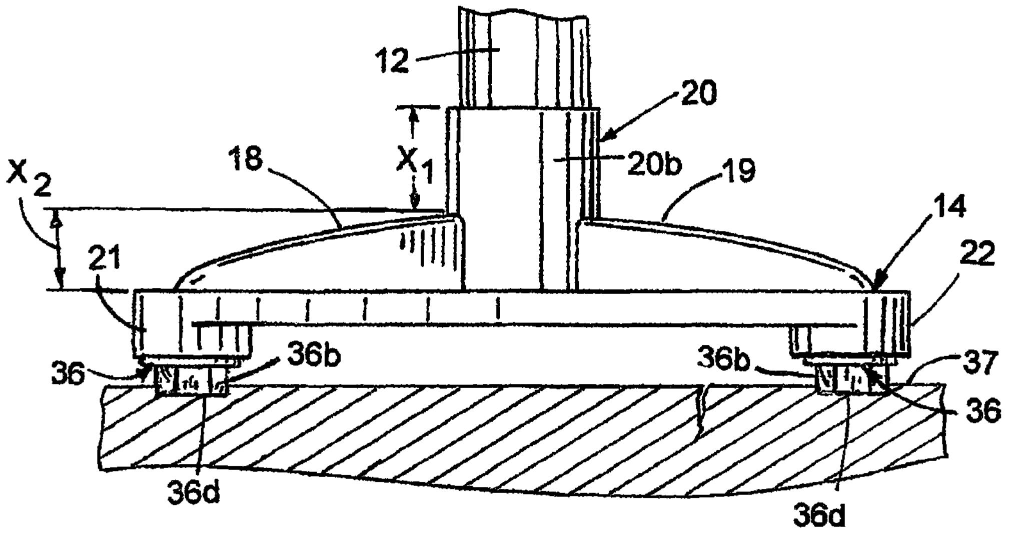
FIG. 4 is a side view of golf club boot of FIG. 1 with ice cleats secured to the peripheral feet on the golf club boot and in engagement with a sheet of ice.

FIG. 3A is an isolated view of a peripheral foot 14*a* with a threaded stud 25 embedded in foot 14*a* typically through axial insertion of threaded stud 25 into an opening formed during molding of foot 14*a*. Stud 25 is shown in perspective in FIG. 3E and includes outer circumferential knurled bands 25*b* and 25*c* with a circumferential recess 25*d* therebetween. The threaded stud 25 can be secured to foot 14*a* through mechanical engagement of knurled bands 25*b* and 25*c* with an interior surface of corner foot 21 of sole 15. Located within stud 25 is a female thread 25*a* that can receive a male thread from a cleat. While only one peripheral foot is described in this example, a stud is embedded in each of the four peripheral feet of sole 14. While cleats 36 are shown attached to the peripheral feet in FIG. 4 alternately one may use golf club boot 14 without cleats. In another embodiment the peripheral feet 21, 22, 23, and 24, which extend outward from sole bottom side 15*b*, keep a central portion of sole 15 off the ground. In still other embodiments the entire bottom side 15*b* can engage a walking surface. Thus, a feature of the invention is that golf club boot 14 can be used on a variety of different surfaces by selecting appropriate cleats.

Figure 3D:
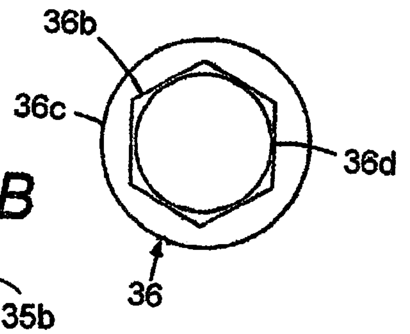
FIG. 3D is an end view of the ice cleat of FIG. 3 with a peripheral edge of the ice cleat engageable with an ice surface.
Figure 3B:
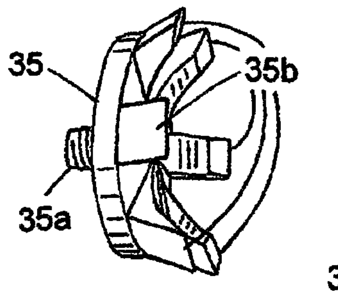
FIG. 3B is a perspective view of a typical floor cleat with a male thread engageable with the embedded stud shown in FIG. 3A.
Figure 3E:
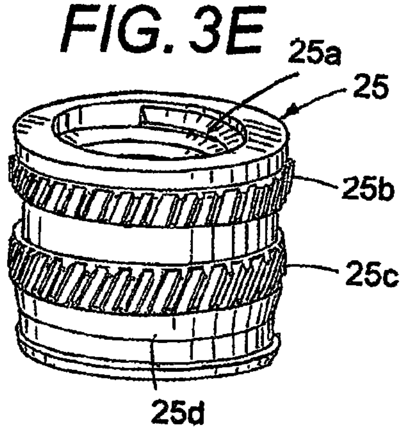
FIG. 3E is an isolated perspective view of the embedded stud in the peripheral foot shown in FIG. 3A.

FIG. 3B is a perspective view of a typical floor cleat 35 with a male thread 35*a* threadingly engageable with a female thread of stud 25. Floor cleat 35 contains a set of circumferential spaced extensions 35*b* engageable with a walking surface such as a floor.

Figure 3C:
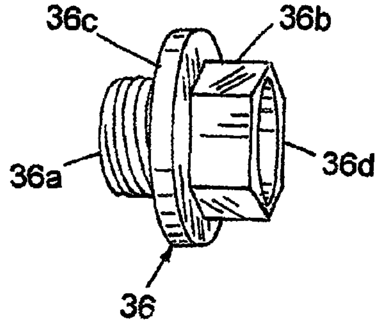
FIG. 3C is a perspective view of a typical ice cleat with a male thread engageable with the embedded stud shown in FIG. 3A.

FIG. 3C is a perspective view of a typical ice cleat 36 with a threaded male extension 36*a*, a circular flange 36*c*, a set of flats comprising a hexagonal head 36*b*, which is engageable with a wrench, and a hexagonal shaped ice edge 36*d* for biting into an icy surface to prevent slippage golf club boot 14 on an icy surface.

FIG. 3D is an end view of the ice cleat 36 of FIG. 3 showing the circular flange 36*c*, a set of flats forming hexagonal head 36*b* with a hexagonal shaped ice edge 36*d* for biting into an icy surface to prevent slippage of the golf club boot 14 on an icy surface.

FIG. 4 is a side view of golf club boot 14 with ice cleat 36 on corner foot 21 having a hexagonal face 36*b* and a ice edge 36*d* engaging a sheet of ice 37. Similarly, identical ice cleats are located at each of the corners 22, 23 and 24 as shown in FIG. 3. In the example shown in FIG. 1 and FIG. 2 resilient sleeve 20 frictionally engages and holds grip 12 within sleeve 20 while the set of ribs 16, 17, 18 and 19, have one face buttressing a portion of the exterior surface 20*b* of sleeve 20 and a second face abutting the top side of sole 15*a*. The set of ribs, with each having an end buttressing the sleeve 20, assist in maintaining sleeve 20 in a vertical orientation when golf club cane 10 is in the stand mode as shown in FIG. 1. In this example ribs 16, 17, 18, and 19, and sleeve 20 of golf club boot 14 are molded in one piece.

In the example shown the thickness $t_1$ and resiliency of sleeve 20 are selected to allow portions of the sleeve between the ribs to flex for insertion of a handgrip while the orthogonal placed ribs 16, 17, 18 and 19 that buttress sleeve 20 are spaced and provide resistance to flexing of portions of sleeve 20 that are directly contacted by the ribs. By way of example with no limitation intended thereto a thickness $t_1$ of 1/16 inch may be used.

As shown in FIG. 1, grip 12 of golf club cane 10 attaches to a topside of golf club boot 14 through an integral and centrally positioned sleeve 20 that frictionally holds grip 12 and golf club cane 10 in a vertical or upright position when no lateral hand force is applied to golf club handle 11, which in this example is an iron.

Figure 9:
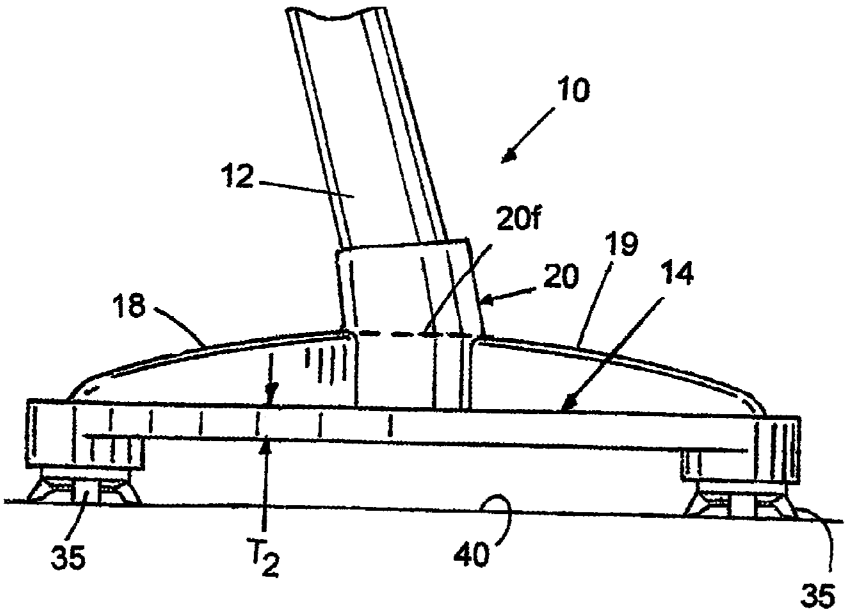
FIG. 9 shows a golf club shaft held in the multifunctional sleeve with the golf club shaft pivoted in a counterclockwise direction.
Figure 10:
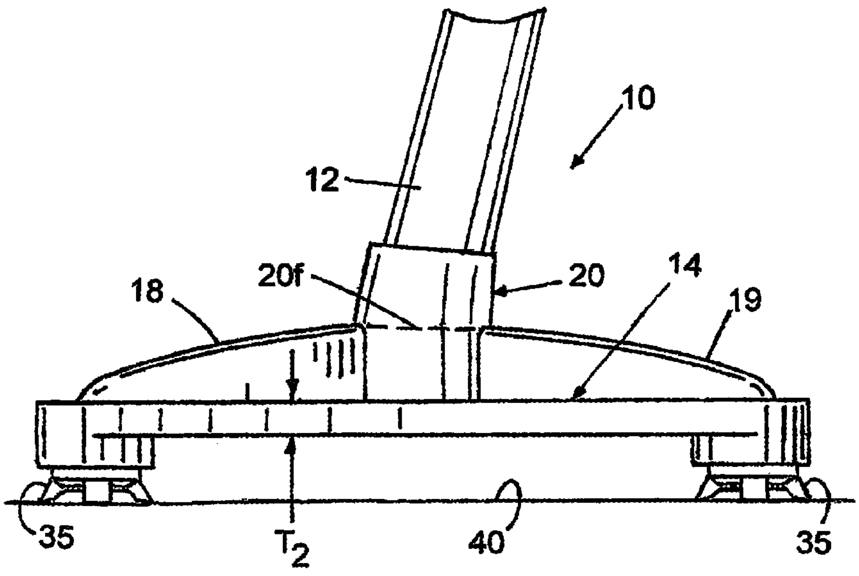
FIG. 10 shows golf club shaft of FIG. 9 with the multi-functional sleeve with the golf club shaft pivoted in clockwise direction.

FIG. 8 shows that although the opposed placement of ribs around sleeve 20 hinders flexing of buttressed portions of multifunctional sleeve 20 while the unsupported portions of multifunctional sleeve 20, which are between the ribs and above the ribs allow the unsupported portions of sleeve 20 to flex and pivot in response to a pivoting force generated by use of golf club cane 10. FIG. 9 shows sleeve 20 flexing and pivoting as grip 12 on golf club cane 10 pivots counterclockwise and FIG. 10 shows sleeve 20 flexing and pivoting as grip 12 on golf club cane 10 pivots clockwise. In both cases cleats 35 remain engaged with floor 40 as the golf club cane 10 pivots in response to use.

A feature of the invention as shown in FIG. 8, is that during a walking motion the resilient sleeve 20 flexes from side to side as grip 12 pivots in response to lateral forces on golf club handle 11. Note, although sleeve 20 pivots in response to the walking motion FIG. 8 shows that the cleats 35, which are on the bottom of sole 15, maintain ground contact as the person walks about using the golf club cane.

A further feature of the invention is that the multifunctional resilient sleeve 20 frictionally and circumferentially engages and secures grip 12 therein without modification of a golf club inserted into the sleeve. In addition, the frictional securement of sleeve 20 to grip 12 is sufficient to maintain golf club 9 and golf club boot 14 as a unit while sole 15 maintains ground contact as the angle of golf club 9 diverges from a vertical when in walking use. However, when in a stand mode sole 15 and the multifunctional resilient sleeve 20 maintain the golf cub cane in a vertical position as shown in FIG. 1.

In this example resilient sleeve 20 holds grip 12 within sleeve 20 during use as a walking cane as the set of ribs 16, 17, 18 and 19, which have one face in engagement with sleeve exterior surface 20*b* and a second face in engagement with top side 15*a* of sole 15, assist in maintaining sleeve 20 and golf club 9 in a vertical orientation when golf club cane 10 is in the stand mode shown in FIG. 1.

In the example shown in FIG. 7 the resiliency of sleeve 20 allows portions of sleeve 20 located between the ribs to flex for insertion of grip 12 even though the orthogonal placed ribs 16, 17, 18 and 19 resist flexing of portions of sleeve 20. FIG. 7 shows hand placement for hand attachment of grip 12 to golf club boot 14. In the hand attachment method, one grasps golf club foot 14 in one hand 80 and with the other hand 90 grasps grip 12. With the hands in position as shown one axially forces an end of grip 12 into an open unsupported top end of sleeve 20 with the unsupported top end of sleeve 20 comprising the portion of sleeve 20 not directly buttressed by ribs 16, 17, 18 and 19, which are designated by $X_1$ in FIG. 4. Next, one continues to apply axial force while twisting grip 12 to bring grip 12 into engagement with interior surface 20*a* of sleeve 20.

The insertion of grip 12 using the compound action of twisting and axial displacement of grip 12 causes unsupported portions of sleeve 20, which are located between the ends of adjacent ribs, and supported portions of sleeve 20 buttressed by the ribs to resiliently yield for axial insertion of grip 12 therein even though portions of the sleeve buttressed by the ribs inhibit yielding.

As shown in FIG. 1, grip 12 of golf club cane 10 attaches to topside of golf club boot 14 through an integral and centrally positioned multifunctional sleeve 20 that frictionally holds grip 12 and golf club cane 10 in a vertical position when no lateral hand force is applied to handle 11. During a walking motion resilient sleeve 20 flexes as shown in FIG. 8, which allows golf club shaft 13 to pivot in response to a lateral force on handle 11, while the cleats 35 maintain ground contact.

A feature of the invention is that the resilient multifunctional sleeve 20 frictionally and circumferentially engages golf club grip 12, without modification of the golf club, to maintain golf club 9 and golf club boot 14 as a unit that flexes allowing cleats 35 on sole 15 to maintain ground contact even though the angle of golf club cane 10 diverges from a vertical when in walking use. When golf club cane 9 is in a stored mode sole 15 and buttressed sleeve 20 maintain the golf cub cane in a vertical position as shown in FIG. 1. Thus, a further feature of the invention is that when a person complets using the golf cane 9 and releases a grasp on handle 11 the resiliency of ribs 16, 17, 18 and 19 that attach to sole 15 and the buttressing of sleeve 20 as well as the resiliency of multifunctional sleeve 20 urge golf club shaft 13 to maintain a stable vertical position or stand mode. In the stand mode, which is illustrated in FIG. 1, the handle 11 is at a height allowing one to readily grasp handle 11 without having to bend over.

A further feature of the invention is that golf club boot 14 is adaptable to different types of floors. For example, if the floor is carpeted and provides uneven support for golf club boot 14 one can tilt club 9 to a vertical orientation before releasing the iron to ensure that the golf club 9 remains upright on the carpeted floor.

FIG. 4 shows the length $x_1$ of sleeve 20, which extends above the ribs, as an unsupported sleeve region. FIG. 2 shows a further unsupported sleeve region of length $x_2$ in FIG. 4 that includes portions of sleeve identified by 20*c*, 20*b*, 20*d* and 20*e*, which are located between adjacent ribs. As by way of example $x_1$ of ⅝ inch and $x_2$ of ⅞ inch. The sleeve exterior cylindrical surface 20*b*, which is supported on opposite sides by ribs 16, 17, 18 and 19, resists expansion of portions of the sleeve 20 that are engagement with the ribs; however, the portions of sleeve 20*c*, 20*b*, 20*d* and 20*e* located between the ribs are not directly supported by the ribs and therefore can flex and stretch for insertion of grip 12 or for pivoting of a golf club therein.

Figure 5:
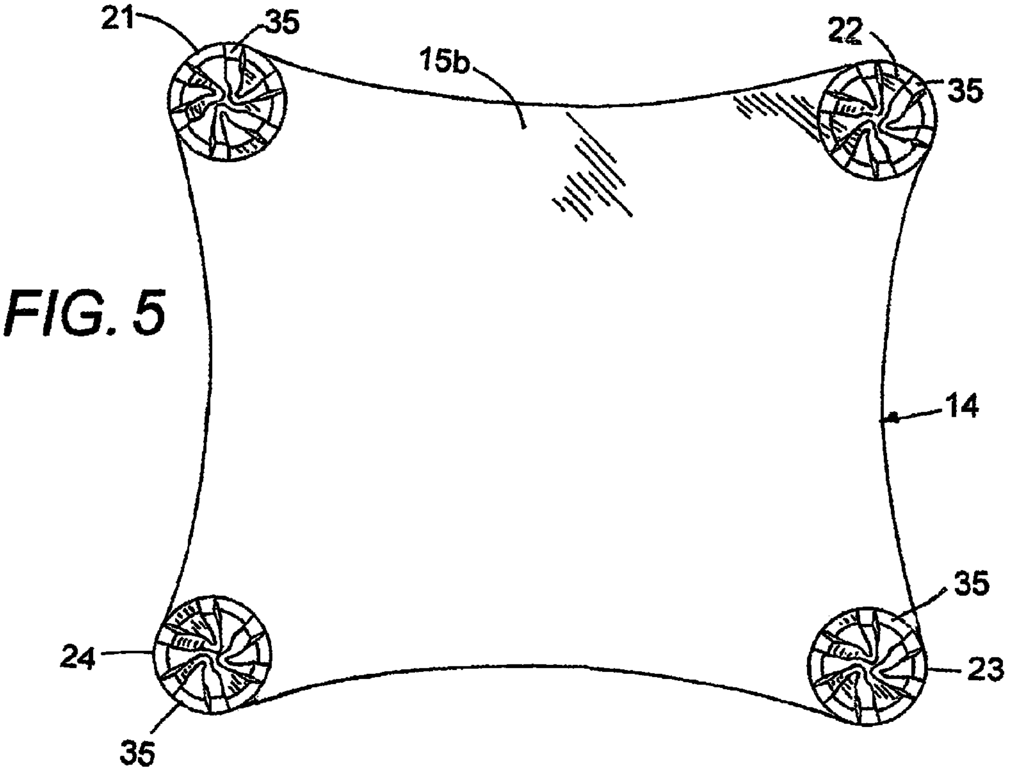
FIG. 5 is a bottom view of the golf club boot of FIG. 1 with a set of cleats secured to the corner feet of golf club boot.

FIG. 5 is a bottom view of golf club boot 14 with a rectangular or elongated shape with sole bottom 15*a* having a set of peripheral feet 21, 22, 23, and 24 each having a floor cleat 35 therein suitable for walking on a floor without damaging the floor.

Figure 6:
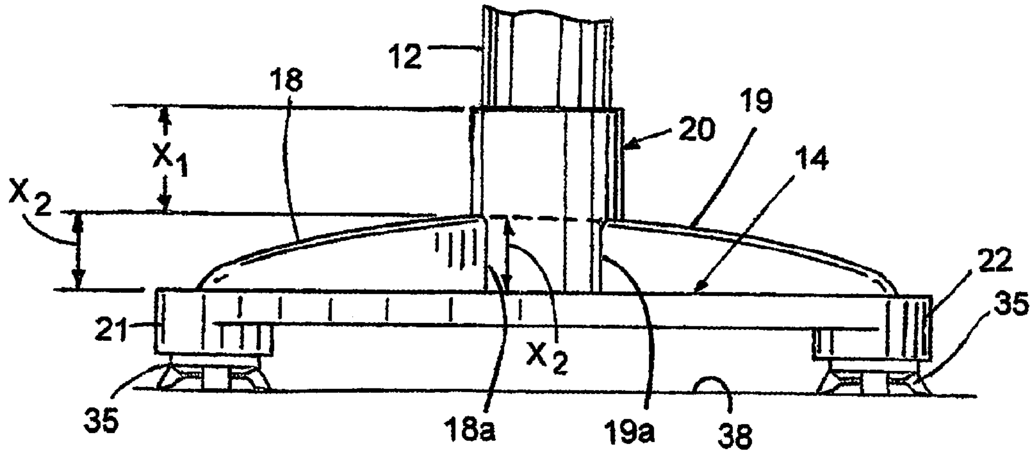
FIG. 6 is a side view of the golf club boot of FIG. 5 showing cleats attached to the bottom side of the golf club boot.

FIG. 6 is a side view of golf club boot 14 of FIG. 5 showing floor cleats 35 secured to the peripheral feet on sole 15. In this example sole 15 maintains the peripheral feet of golf club boot 14 in contact with floor 38.

As shown in FIG. 4 and in FIG. 6 a top portion of resilient sleeve 20 extends a distance $x_1$ above the top of ribs 18 and 19 and is unsupported by ribs 18 and 19. Similarly, the end of ribs 16 and 17 (see FIG. 2) also do not support the top end of resilient sleeve 20 leaving sleeve 20 with a free end, which is unsupported by any of the ribs. However, the lower end of sleeve 20, which is denoted by $x_2$, is supported by rib ends 16*a*, 17*a*, 18*a* and 19*a*. As a result, resilient sleeve 20 has an unsupported top portion that flexes in response to a pivoting of a golf club grip in sleeve 20 while the ribs that buttress a bottom portion of sleeve 20 resist flexing of sleeve during a pivoting of a golf club grip from side to side while the unsupported regions of sleeve 20, which are between the ends of the ribs, retain sufficient flexibility to pivot in response to pivoting of a golf club grip in sleeve 20.

FIG. 9 illustrates a feature of the invention namely, that the unsupported portion of the sleeve 20 above adjacent rib 18 can pivot counterclockwise, which corresponds to cane position 10*a* in FIG. 8. FIG. 10 shows that sleeve 20 above adjacent ribs pivots can also pivot clockwise, which corresponds to cane position 10*c* in FIG. 8. The pivoting of the sleeve occurs from the walking action of a person with a cane requires a person to plant the tip of the cane on the ground and move forward while the cane is engaged with the ground. In this example the flex permitting golf club cane 9 to pivot with respect to sole 15. This feature allows sole 15, with or without cleats, to maintain ground contact as a person walks about using golf club cane 10.

A feature of the invention is that when a person is done using golf cane 9 and releases a grasp on handle 11 the resiliency of ribs 16, 17, 18 and 19 that attach to sole 15 and to the sleeve 20 provide a force that urges golf club shaft 13 to a vertical or near vertical position with handle 11 at a height that allows one to readily grasp handle 11 without having to bend over to pick up golf club cane 10.

FIG. 7 shows the process of hand attachment of a golf club grip 12 to golf club boot 14. In this method one grasps golf club foot 14 in one hand 80 and grasps grip 12 with the other hand. With the hands in position as shown one axially forces the end of the handgrip 12 into the open and free end of sleeve 20 with the free end of sleeve 20 being the portion of the sleeve that is not directly supported by the ribs 16, 17, 18 and 19.

FIG. 8 illustrates a further feature of the invention namely, that the portion of sleeve 20 not supported between adjacent ribs can pivotally flex permitting the golf club cane 9 to pivot with respect to sole 15. This feature allows sole 15 with or without cleats to maintain ground contact as a person walks about using golf club cane 10.

FIG. 9 shows grip 12, which is located within the multi-functional sleeve 20, pivoted counterclockwise. Note, that in counterclockwise position the portion of sleeve 20 above the dashed line 20*f* pivots with grip 12 since the resistance to pivoting is provided only by sleeve while the portion of sleeve 20 below the dashed line has a greater resistant to further pivoting because of the resistance provided by the combination of resistance of ribs 16, 17, 18, and 19 that buttress a side of sleeve 20.

FIG. 10 shows grip 12, which is located within the multi-functional sleeve 20, pivoted clockwise within sleeve 20. Similarly, the portion of sleeve 20 above the dashed line 20*f* pivots with grip 12 while the portions of sleeve 20 that are buttressed by the ribs (i.e. below the dashed line 20*f*) are restrained from pivoting by the four ribs 16, 17, 18, and 19.

In the example shown in FIG. 9 and FIG. 10 the portions of sleeve 20 below the dashed line 20 are restrained but not inhibited from pivoting by the four ribs 16, 17, 18, and 19 while the unsupported portions of the sleeve 20 between ribs 16, 17, 18 and 19 flex to accommodate a pivoting action of grip 12 therein.

Thus, a feature of the invention is that as grip 12 pivots from side-to-side the grip remains frictionally secured within sleeve 20 while the cleats 35 of golf club cane 10 remain in contact with floor 40 as shown in FIG. 8, FIG. 9, and FIG. 10.

We claim:

1. A golf club cane comprising:

a golf club boot having a top side, a peripheral region, and a sole;

a multifunctional sleeve having a sidewall extending from the top side with said sidewall having an interior surface and an exterior surface;

a golf club having a golf club grip frictionally secured within said multifunctional sleeve with a golf club shaft extending upward from the sleeve and a golf club head extending laterally from the golf club shaft providing a handle for the golf club cane;

a set of ribs on the top side of said golf club boot with said set of ribs each having a face buttressing an exterior surface of the multifunctional sleeve and a further face engaging the top side of said golf club boot, said multifunctional sleeve buttressed by the set of ribs maintaining the golf club shaft in a stand-alone position when the handle of the club cane is released while a further portion of the sleeve not buttressed by the set of ribs flexes in response to a walking action allowing the sole to maintain ground engagement as a person walks about using the golf club cane while each of the ribs in the set of ribs in engagement with the sole stiffen the sole to inhibit flexing of the sole.

2. The golf club cane of claim 1 wherein the multifunctional sleeve, the golfclub boot and the set of ribs comprise a one-piece elastomer.

3. The golf club cane of claim 1 wherein the multifunctional sleeve is spaced inward from the peripheral region so that when the golf club cane is in a stand mode a stiffness of the sole of the golf club boot prevents flexing of the sole in response to a force caused by a center of mass of the golf club head being laterally offset from an axis extending vertically from the multifunctional sleeve as the boot of golf club cane rests on a horizontal surface.

4. The golf club cane of claim 1 wherein the exterior surface of the multifunctional sleeve not buttressed by the set of ribs expands in response to hand insertion of a golf club grip therein while a resiliency of the multifunctional sleeve contracts the multifunctional sleeve around the golf club grip thereby maintaining the golf club secured to the golf club boot.

5. The golf club cane of claim 1 wherein the golf club boot comprises urethane.

6. The golf club cane of claim 1 wherein the golf club boot comprises a thermoplastic rubber resin.

7. The golf club cane of claim 1 wherein the golf club boot has a rectangular shape, and the multifunctional sleeve is centrally located on the top side of the golf club boot.

8. The golf club cane of claim 1 wherein the set of ribs comprise four ribs with each of the ribs in the set of ribs extending from the sidewall of the multifunctional sleeve toward a corner of the golf club boot, and each of the ribs in the set of ribs are in axial alignment with another rib in the set of ribs.

9. The golf club cane of claim 1 wherein the multifunctional sleeve flexes for insertion of the golf club and contracts forming an interference fit with the golf club grip, said inference fit maintaining the golf club in engagement with the golf club boot as the multifunctional sleeve and the golf club shaft pivot with respect to the sole.

10. The golf club cane of claim 1 where the set of ribs includes at least four ribs diagonally positioned around the multifunctional sleeve with each of the at least four ribs having one face extending partially along a side of the sleeve and another face extending along the sole of the golf club boot, where the sole, the sleeve and the set of ribs comprise one piece.

11. The golf club cane of claim 1 wherein the sole includes a set of peripheral feet.

12. The golf club cane of claim 11 wherein each of the set of peripheral feet include a stud having a female thread engageable to a cleat.

13. The golf club cane of claim 1 wherein the golf club grip is frictionally secured in the sleeve through an interference fit between the sleeve and the golf club grip, said sleeve extending vertically upward from the sole of the golf club boot, said sleeve maintaining the golf club therein in the stand-alone position where the sleeve extends normally from the sole of the golf club boot and in a walking mode where the sleeve flexes from side to side as the sole of the golf club boot maintains ground engagement.

14. The golf club cane of claim 1 wherein an inside surface of said multifunctional sleeve forms an interference fit with the golf club grip when the golf club grip is located therein.

15. The golf club cane of claim 1 wherein the sole, the multifunctional sleeve and the ribs comprise the same material with said multifunctional sleeve having sufficient stiffness to retain the golf club therein in an upright condition when the golf club secured therein is used as a stand but sufficient flexibility to allow the multifunctional sleeve to pivot on the sole to maintain ground engagement of the sole during use as a golf club cane.

16. The golf club cane of claim 1 wherein said sole includes a set of inserts therein with a female thread for threadingly engaging a set of cleats thereto.

17. The golf club boot of claim 1 having a walking mode of use and the stand-alone position wherein the sole comprises a resilient sole having a peripheral edge; and said multifunctional sleeve sufficiently spaced from the peripheral edge to hold the golf club therein in an upside down condition when the golf club boot is used in the stand-alone position, said multifunctional sleeve pivotable with respect to the sole when the golf club therein is used in the walking mode enabling the sole of the golf club boot to maintain ground engagement as a person walks about using the golf club head as a handle.

* * * * *